United States Patent
Herman et al.

(10) Patent No.: US 11,927,962 B2
(45) Date of Patent: Mar. 12, 2024

(54) SYSTEM AND METHOD FOR DETECTING AND ADDRESSING ERRORS IN A VEHICLE LOCALIZATION

(71) Applicant: Ford Global Technologies, LLC, Dearborn, MI (US)

(72) Inventors: David Michael Herman, Oak Park, MI (US); Yashanshu Jain, Dearborn, MI (US); Brian Quinn Kettlewell, Cambridge (CA); Ali Husain, Dearborn, MI (US); Ashwin Arunmozhi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 466 days.

(21) Appl. No.: 17/071,689

(22) Filed: Oct. 15, 2020

(65) Prior Publication Data
US 2022/0121210 A1 Apr. 21, 2022

(51) Int. Cl.
*G05D 1/02* (2020.01)
*G05D 1/00* (2006.01)
(Continued)

(52) U.S. Cl.
CPC ......... *G05D 1/0214* (2013.01); *G05D 1/0221* (2013.01); *G06F 16/245* (2019.01); *G06N 3/08* (2013.01); *G07C 5/0816* (2013.01); *B60W 2050/0215* (2013.01); *B60W 2050/0295* (2013.01); *B60W 2050/146* (2013.01); *B60W 2556/10* (2020.02); *B60W 2556/35* (2020.02);
(Continued)

(58) Field of Classification Search
CPC .. G05D 1/0214; G05D 1/0221; G07C 5/0816; G01S 19/215; B60W 2050/0215; B60W 2050/0295; B60W 2556/60; B60W 2556/35; B60W 2050/146
USPC .............................................. 701/29, 30, 31
See application file for complete search history.

(56) References Cited

U.S. PATENT DOCUMENTS 9,702,964 B2    7/2017   Stahlin et al.
9,764,712 B2 *   9/2017   Ur .......................... G06F 21/577
(Continued)

FOREIGN PATENT DOCUMENTS

CN    109358344 A    2/2019
WO    WO-2017079321 A1 *   5/2017  ............ B60W 50/02
WO    WO-2020205655 A1 *   10/2020  ............ B60W 50/00

OTHER PUBLICATIONS

Junjie Shen et al., Poster: Security Analysis of Multi-Sensor Fusion Based Localization in Autonomous Vehicles, available at https://www.ndss-symposium.org, 3 pages.

*Primary Examiner* — Donald J Wallace
(74) *Attorney, Agent, or Firm* — Frank Lollo; Bejin Bieneman PLC

(57) ABSTRACT

The present disclosure relates to a system and a method for addressing an error in a localization system that includes monitoring a plurality of sensors of a driver assistance system in real-time, with each sensor generating a data stream. The method further includes identifying a sensor having an anomalous data stream and calculating a primary localization and a backup localization. The primary localization calculation includes the anomalous data stream and the backup localization calculation does not include the anomalous data stream. Further, the method includes executing an action when the backup localization error estimate exceeds a threshold.

18 Claims, 8 Drawing Sheets

(51) Int. Cl.
*G06F 16/245* (2019.01)
*G06N 3/08* (2023.01)
*G07C 5/08* (2006.01)
*B60W 50/02* (2012.01)
*B60W 50/029* (2012.01)
*B60W 50/14* (2020.01)
*G01S 19/21* (2010.01)

(52) U.S. Cl.
CPC ........ *B60W 2556/60* (2020.02); *G01S 19/215* (2013.01)

(56) References Cited

U.S. PATENT DOCUMENTS

| | | |
|---|---|---|
| 2019/0243002 A1 | 8/2019 | Song |
| 2021/0221403 A1* | 7/2021 | Gyllenhammar .... G05D 1/0276 |
| 2022/0065980 A1* | 3/2022 | Ahlbrecht ............ G01C 25/005 |

* cited by examiner

| Safety Level | 0 | 1 | 1.5 | 3 | 3.5 |
|---|---|---|---|---|---|
| Location Error | Show Map | Provide Map Route | Turn by Turn Guidance | Highway Assist | Highway Assist + lane change |
| < 1 meter | Nominal | Nominal | Nominal | Nominal | Nominal |
| < 2 meter | Nominal | Nominal | Nominal | Nominal | User confirm lane change + Request hands on wheel |
| < 3 meter | Nominal | Nominal | Modify Function | Request hands on wheel | |
| < 5 meter | Increase Pin Size | Request user input current location | Provide Warning | | Fallback to HA + Request hands on wheel |
| < 10 meter | Show error range in map | | Disable Feature | Disable Feature | Disable Feature |
| < 20 meter | | | | | |
| < 40 meter | Disable Map zoom | Disable Routing | | | |

Figure 5

SYSTEM AND METHOD FOR DETECTING AND ADDRESSING ERRORS IN A VEHICLE LOCALIZATION

TECHNICAL FIELD

The present disclosure relates to aspects of monitoring a driver assistance system in vehicles.

BACKGROUND

Vehicles are increasingly being equipped with Advanced Driver Assistance System (ADAS) that utilizes one or more on-board sensors to sense an external environment such that the vehicle can be navigated through a terrain with minimal human intervention. The onboard sensors communicate with each other through wireless and/or wired communication and generate data streams that are provided to the ADAS in real-time for a robust driverless maneuver through different terrains. While ADAS is developed to provide efficient, effortless, and safe driving to a user sitting inside the vehicle, the system could be subject to spoofing.

Accordingly, a need exists for a system and related methods that can monitor the driver assistance system and protect the vehicle and the user of the vehicle from spoofing.

SUMMARY

The present disclosure relates to aspects of vehicle features including monitoring a driver assistance system in a vehicle by detecting outlier sensors, computing localization error estimates, notifying a user of a detected spoofing, and providing safe recovery for the vehicle against such spoofing.

According to one aspect of the present disclosure, a method for addressing an error in a localization system includes monitoring a plurality of sensors of a driver assistance system in real-time, with each sensor yielding or generating a data stream. The method further includes identifying a sensor of the plurality of sensors having an anomalous data stream and calculating a primary localization and a backup localization. The primary localization calculation includes the anomalous data stream and the backup localization calculation does not include the anomalous data stream. The method further includes executing an action when error estimate of the backup localization exceeds a threshold.

In one aspect of the present disclosure, the action includes removing the anomalous data stream of the sensor from use by the driver assistance system. In another aspect of the present disclosure, the action includes displaying a notification when the anomalous data stream is detected.

In one aspect of the present disclosure, a driver assistance system includes a plurality of sensors, a memory, and a processor that executes instructions stored in the memory. The processor monitors the plurality of sensors of the driver assistance system in real-time such that each sensor generates a data stream. The processor then identifies a sensor of the plurality of sensors having an anomalous data stream. The processor calculates a backup localization and a primary localization, wherein the primary localization calculation includes the anomalous data stream and the backup localization calculation does not include the anomalous data stream. The processor may execute an action when a difference between the main primary localization and the backup localization exceeds a threshold.

BRIEF DESCRIPTION OF THE DRAWINGS

The above-mentioned aspects are further described herein with reference to the accompanying figures. It should be noted that the description and figures relate to exemplary aspects and should not be construed as a limitation to the present disclosure. It is also to be understood that various arrangements may be devised that, although not explicitly described or shown herein, embody the principles of the present disclosure. Moreover, all statements herein reciting principles, aspects, and examples of the present disclosure, as well as specific examples, are intended to encompass equivalents thereof.

FIG. 5 illustrates an exemplary safe recovery table that may be employed by the system to monitor and/or control one or more features of the driver assistance system, in accordance with one aspect of the present disclosure.

DETAILED DESCRIPTION

Figure 1:
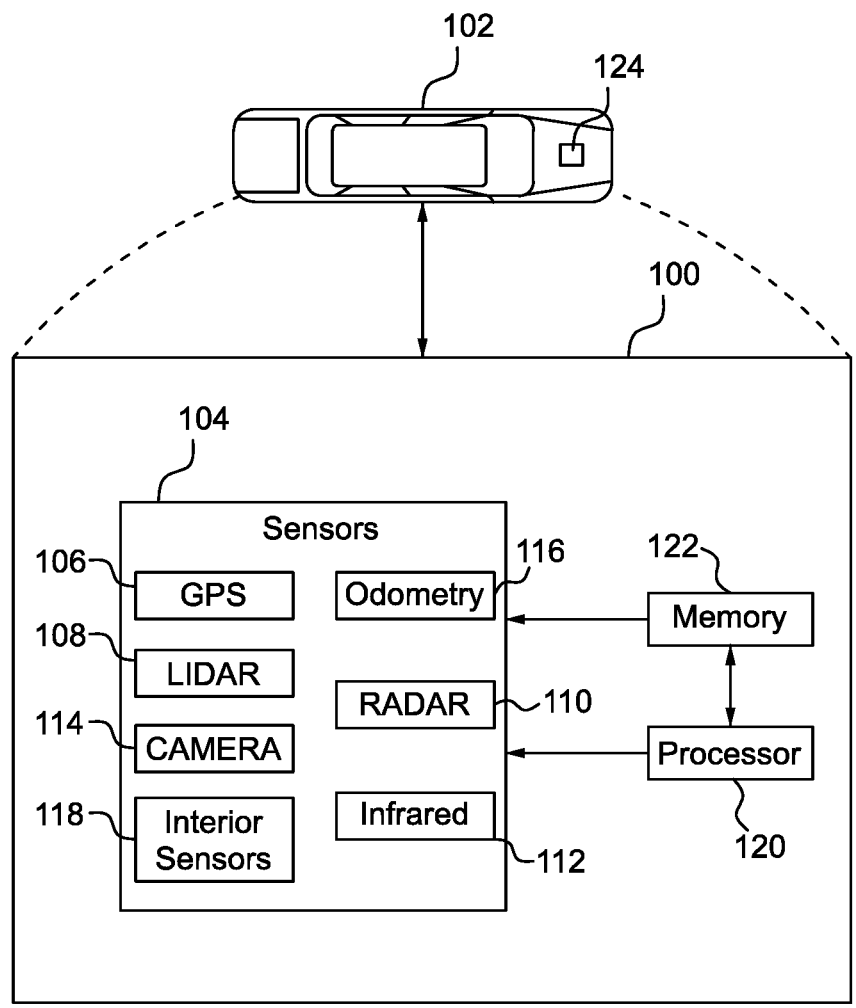
FIG. 1 illustrates a schematic view of a vehicle having a driver assistance system, in accordance with one aspect of the present disclosure.

The present disclosure provides examples directed to aspects of addressing errors in a localization system by monitoring and analyzing data streams yielded by a plurality of sensors of a driver assistance system in real-time. Based on the data streams from the plurality of sensors, a sensor yielding an anomalous data stream is identified. Upon identifying the sensor that yields the anomalous data stream, a primary localization and a backup localization are calculated. The primary localization calculation includes the anomalous data stream while the backup localization calculation does not include the anomalous data stream. A difference between the calculated primary localization and the backup localization can be determined and an action can be executed if the difference exceeds a predetermined threshold. In at least one embodiment, the difference between the calculated primary localization and the calculated backup localization is a localization error estimate. An action is executed when the error estimate of the backup localization exceeds a threshold. The action, such as providing a notification to the user, is performed when the localization error estimate exceeds the threshold. In an example, the ADAS of the vehicle is turned off if the backup localization provides information that current location of the vehicle 102 is a location whose entry is prohibited. In another example, the backup localization information has an amount of uncertainty, that is an error estimate corresponding to the accuracy. A preset threshold is a limit within which the amount of uncertainty in the accuracy in the backup localization is tolerable. The ADAS is turned off if the uncertainty in the backup localization exceeds the preset threshold. Therefore, the backup localization has to be stabilized before being considered to detect errors and support the ADAS functionality. In another embodiment, the ADAS is turned off if there is a pre-determined percentage of chance that the vehicle is in a region that has a prohibited entry based on the location from the backup localization or based on the primary localization with the localization error estimate. The accurate backup localization is determined by a Kalman filter estimate probabilistic or statistical model by considering an amount uncertainty, that is the localization error estimate along with the primary localization data from the sensors.

The data stream yielded by each of the plurality of sensors allows the driver assistance system to perform one or more autonomous/semi-autonomous operations on the vehicle. Accordingly, the accuracy of the data stream provided by each of the plurality of sensors is eminent for a seamless experience of the driver assistance system. To that end, any alteration, jamming, and/or spoofing of the data stream yielded by any of the plurality of the sensors may put the vehicle and/or the user of the vehicle at risk.

In the following description, certain specific details are set forth in order to provide a thorough understanding of various disclosed examples. However, one skilled in the relevant art will recognize that examples may be practiced without one or more of these specific details, or with other methods, components, materials, etc.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise.

Reference throughout this specification to "one example" or "an example" means that a particular feature, structure or characteristic described in connection with the example is included in at least one example. Thus, the appearances of the phrases "in one example" or "in an example" in various places throughout this specification are not necessarily all referring to the same example. Furthermore, the particular features, structures, or characteristics may be combined in any suitable manner in one or more examples.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

FIG. 1 illustrates a schematic view of a vehicle 102 having a driver assistance system 100 (hereinafter referred to as "system" 100), in accordance with one aspect of the present disclosure. The system 100 is configured to communicate with one or more components of the vehicle 102, such as an electronic control unit (ECU) 124, and the like, to automate or semi-automate one or more operations of the vehicle 102 including, but not limited to, collision avoidance, lane assist, park assist, or the like. In at least one instance, the ECU 124 is a telematics control unit operable to control tracking of the vehicle 102.

In at least one instance, the system 100 includes a plurality of sensors 104 including, but not limited to, a global positioning system (GPS) sensor 106, a lidar sensor 108, a radar sensor 110, an infrared sensor 112, a camera 114, an odometry sensor 116, and one or more interior sensors 118. Each of the plurality of sensors 104 is configured to yield a data stream in real-time. For instance, the GPS sensor 106 yields a data stream that provides information related to a location of the vehicle 102, while the camera 114 yields a data stream that may provide information related to an environment external to the vehicle 102. The plurality of sensors 104 includes sensors that provide an absolute localization determination, for example, GPS sensor 106 and a relative localization determination, for example, odometry sensor 116. The absolute localization determination includes estimation of the vehicle 102 without using the information of a previous position of the vehicle 102. The relative localization determination, for example using the odometry sensors 116, includes calculation of current position of the vehicle 102 by using a previously determined position and estimated speeds over an elapsed time.

In one example, at least one sensor of the plurality of sensors 104 is located on a device (not shown) of a user of the driver assistance system 100. The device may be any portable computing device, such as a mobile device, a smartphone, a tablet computer, a smart watch, a laptop computer, a portable music player, or other similar device capable of communicating with other device(s) and/or the vehicle 102. In another example, at least one sensor of the plurality of sensors 104 is located on the vehicle 102. For instance, the lidar sensor 108 may be located on a roof (not shown) of the vehicle 102, while a camera 114 may be located at a front portion of the vehicle 102 (i.e. in proximity to the bumper assembly). Those skilled in the art would appreciate that all of the plurality of sensors 104 may be located either on the vehicle 102 or on the device of the user.

The system 100 includes a processor 120 and a memory 122. The processor 120, amongst other capabilities, is configured to fetch and execute computer-readable instructions stored in the memory 122. Those skilled in the art would appreciate that the processor 120 may be one or more microprocessors, microcomputers, microcontrollers, digital signal processors, central processing units, state machines, logic circuitries, and/or any devices that manipulate signals based on operational instructions.

In at least one instance, the processor 120 monitors the plurality of sensors 104 in real-time to analyze the data stream yielded by each of the plurality of sensors 104. Upon analyzing the data streams, the processor 120 can identify a sensor of the plurality of sensors 104 having an anomalous data stream. The sensor yielding the anomalous data stream may hereinafter be referred to as an outlier sensor.

In one aspect of the present disclosure, the system 100 employs at least one of an ensemble voting scheme (EVS) or a recurrent neural network (RNN) framework to identify the at least one outlier sensor of the plurality of sensors 104. The EVS and/or the RNN scheme may be configured to perform an independent, unsupervised outlier sensor detection on the data stream yielded by each of the plurality of sensors 104.

Those skilled in the art would appreciate that the EVS and RNN frameworks may include suitable algorithms configured to detect an anomaly in the data streams, thereby identifying the at least one sensor of the plurality of sensors 104 as the outlier sensor. Some of the exemplary frameworks that may be employed by the EVS and/or the RNN may include "collective contextual anomaly detection using sliding window (CCAD-SW) framework", autoencoder, and the like. In an embodiment, hardware and software implementation for complying with the functional safety standard ISO 26262, Automotive Safety Integrity Level (ASIL), and Safety Of The Intended functionality (SOTIF) uses hardware signing of Controller Area Network (CAN) messages from the sensors of the vehicle 102. The hardware signing of the CAN messages is used for authentication of identity of the sensor and can provide information about sensor being a faulty and/or a suspect of being faulty, being hacked, etc. The lack of CAN messages from the sensor is used to detect faulty state of the sensor.

In one example, the EVS detects the at least one outlier sensor of the plurality of sensors 104 using sensor fusion technique. Under this technique, the data stream yielded from and/or generated by at least two sensors of the plurality of sensors 104 is combined. Subsequently, a Bayesian approach is used to perform an ensemble of classification functions (for example, spectral clustering, K-means analysis) on the combined data stream to determine majority-voting consensus against the data stream yielded from the at least one outlier sensor. The data stream yielded from the at least one outlier sensor is also referred to as an outlier data stream. The outlier data stream is the anomalous data stream from the outlier sensor of the plurality of sensors 104.

It should be noted that the data stream yielded from one or more of the plurality of sensors 104 help in detecting localization of the vehicle 102. In one example, the processor 120 calculates a backup localization and a primary localization of the vehicle 102 using the data stream yielded by the plurality of sensors 104. It should be noted that the backup localization is an estimated localization of the vehicle 102 detected based on the data stream yielded by each of the plurality of sensors 104 such that none of the plurality of sensors 104 is detected as the outlier sensor. The primary localization is an estimated localization of the vehicle 102 that is detected based on the data stream yielded by each of the plurality of sensors 104 when at least one of the plurality of sensors 104 is detected as the outlier sensor, wherein the data is retrieved prior to detection of the anomalous data stream. To that end, the processor 120 calculates the backup localization based on the data stream yielded by the each of the plurality of sensors 104, prior to detection of the at least one outlier sensor from the plurality of sensors 104.

The calculation of the backup localization is based on a subset of the plurality of sensors 104 excluding the sensor(s) having the anomalous data stream(s). In some instances, the backup localization can include an estimated location of the vehicle 102 along with an uncertainty of the estimated location, for example, a 10% chance of being about 5 meters away from the estimated location. In an example, the uncertainty or an error in the backup localization can exist and/or build up if the ADAS is initialized after vehicle 102 is turned on as the backup localization values may be erased while vehicle 102 was off. In another example, the error in the backup localization exists or builds up if one or more sensors of the plurality of sensors 104 is turned off while the vehicle 102 is stopped, to save power. Upon starting the vehicle 102, the one or more sensors of the plurality of sensors 104 are powered up, however the plurality of sensors 104 require a period of time to stabilize. The period of time required by the plurality of sensors 104 to stabilize results in existence or building up of the error in the backup localization. In another example, the error in the backup localization can exist and/or build up if the vehicle 102 is parked or moving within a parking structure or parked and/or moving in between tall structures. The presence of the vehicle 102 in the parking structure and/or in between tall structures or buildings can impact the signals, by a way of deflection. The signals that are impacted are used for determining the backup localization values, thereby resulting in existence or building up of the error in the backup localization. The error or the build-up of the error is not real and not a result of spoofing. Therefore, the backup localization has to be stabilized before being considered to detect errors and support the ADAS functionality.

The calculation of the primary localization is based on data from the anomalous data stream of the sensor, where the data is retrieved prior to the detection of the anomalous data stream. On detecting the outlier data stream yielded from the at least one outlier sensor, representing anomalous localization of the vehicle 102, the processor 120 calculates the primary localization.

In at least one instance, the processor 120 calculates the backup localization and the primary localization using a lookup table, where the lookup table (shown in FIG. 2) helps in identifying the localization of the vehicle 102 based on the data stream yielded by each of the plurality of sensors 104 in real-time. The processor 120 retrieves the backup localization from the lookup table. Using the calculated backup localization and primary localization, the processor 120 determines a localization error estimate. It should be noted that the localization error estimate may be employed in estimating a deviation of the localization of the vehicle 102 from its estimated localization. In one example, the difference between the calculated backup localization and the calculated primary localization represents the localization error estimate. When the localization error estimate exceeds a predetermined threshold, the processor 120 detects a spoofing attack on at least one of the plurality of sensors 104. It may be contemplated that the predetermined threshold may include a value beyond which the at least one of the plurality of sensors 104 may be declared as the outlier sensor by the system processor 120. In one example, each of the plurality of sensors 104 is assigned with a fixed value that is stored in the memory 122 as the corresponding predetermined threshold. However, in other example, the predetermined threshold is calculated dynamically by the processor 120 based one or more parameters including, but not limited to, historical threshold values used to detect the at least one outlier sensor from the plurality of sensors 104.

When the localization error estimate exceeds the threshold, the processor executes an action that leads to actuation of the vehicle 102. In one example, the processor 120 executes an action that includes displaying notification or providing alerts to the user of the vehicle 102 about the spoofing attack on the vehicle 102. Specifically, the processor 120 selects a notification type to notify or alert the user about the spoofing attack. The selected notification type may include at least one of disabling the at least one outlier sensor, removing the anomalous data stream yielded from each of the at least one outlier sensor from use by the system 100, or displaying a notification, such a message or a signal, to the user when the anomalous data stream is detected. The removal of the anomalous data stream yielded by each of the at least one outlier sensor from use also includes ignoring vehicle notifications from the outlier sensors via vehicle to everything (V2X) communication.

In one example, the processor 120 may monitor a user state to select the notification type. For instance, the processor 120 may monitor the attentiveness of the user to select the notification type. In at least one instance, the system 100 determines that the user is attentive and interacting with a display unit, such as a Human Machine Interface (HMI) display unit by detecting using a driver state monitoring camera, detecting button presses, etc., to control the vehicle 102. Upon determining that the user is attentive and interacting with the display unit, the processor 120 displays the notification about the at least one outlier sensor to the user. The displayed notification may be the message or the signal to the user. Alternatively, in another scenario when the system 100 determines lack of attentiveness and/or lack of interaction of the user with the display unit (e.g. HMI), the processor 120 can perform actuation of the vehicle 102 by directly disabling each of the at least one outlier sensor and/or switching function to another sensor that is not the outlier sensor. In at least one instance, the processor 120 determines that a wheel speed sensor is spoofed or faulty, the system 100 provides a corresponding notification on the display unit. Upon determining a lack of attentiveness and/or lack of interaction of the user with the display unit (e.g. HMI), the processor 120 switches from usage of wheel speed sensor to GPS and/or engine-based estimate to determine or estimate the wheel speed.

In at least one instance, a valid source for a GPS sensor for providing data corresponding to location is a GPS satellite. However, GPS in some locations, such as urban canyons or high-rise buildings and/or with weather phenomena, may lead to GPS errors by the GPS sensor. The GPS error is nominal when the GPS sensor is not near large buildings and not experiencing weather phenomena. In the case of spoofing, a miscreant's transmitter, that is a malicious actor's transmitter, may be a source for the GPS sensor for providing data corresponding to the false location. To determine if the GPS error is due to spoofing or fault, the processor 120 may have to further perform a lookup to detect spoofing. Yet, a feature for determining location using a GPS sensor is deactivated based on the current error in location regardless of the cause in the location error estimate of the GPS sensor. The deactivation of the GPS sensor, in an embodiment, leads to deactivation of features such as turn by turn navigation, mapping, etc., where the features rely on localization from the GPS sensor that has a known error estimate. For example, the error estimate in the GPS sensor localization information is less than 5 meters.

Upon notifying the user, in one example, the processor 120 removes the anomalous data stream of each of the at least one outlier sensor from use by the system 100, thereby providing a safe recovery of the vehicle 102. In an example, the processor 120 removes the anomalous data stream of each of the at least one outlier sensor upon lapse of a time period after displaying the notification to the user of the vehicle 102. In another example, the processor 120 removes the anomalous data stream of each of the at least one outlier sensor immediately upon detecting the at least one outlier sensor. The processor 120 tracks the anomalous data stream of each of the at least one outlier sensor. Upon detecting that the tracked data stream is now below the threshold, the processor adds the anomalous data stream of each of the at least one outlier sensor for use by the system 100. In other words, the system 100 again starts using the at least one outlier sensor once the at least one outlier sensor starts behaving normal and any anomaly from the anomalous data stream is removed.

In at least one instance, the estimation of error in location is based only on location sensors that do not include the anomalous data stream. Each sensor of the plurality of sensors 104 has an error, variance, bias, etc., but after combining, the error can be reduced amongst an ensemble of localization methods. However, if a method of determining the location, such as GPS, is not considered then the system 100 falls back onto other methods where wheel speed and/or inertial measurement unit (IMU) are used for determining the speed and eventually the location. However, usage of the wheel speed sensor and/or the IMU leads to an increase in error that may relate to the contribution of spoofed/failed location sensors to the accuracy of the sensor fusion thus resulting in increased statistical certainty of the estimate localization.

The location of the faulty/spoofed location sensors may aid in determining the intent of the malicious actor. For example, a malicious actor may block the GPS receipt by sending out noise at that frequency or may choose to send out real looking GPS data which sends the vehicle 102 to the north pole. In other cases, the heading or elevation of the GPS signal may be changed. For example, a miscreant may switch the heading of the GPS but keep the location roughly correct in order to trigger an ADAS warning that you are traveling on the highway in the wrong direction.

Figure 2:
FIG. 2 illustrates a lookup table that can be used to determine a backup localization and a primary localization, in accordance with one aspect of the present disclosure.

FIG. 2 illustrates a lookup table 200 that can be used to determine the backup localization and the primary localization, in accordance with one aspect of the present disclosure. In one example, the lookup table 200 may be stored in the memory 122 and may be retrieved by the processor 120 for use in detecting the at least one outlier sensor, based on the calculated backup and primary localization. The lookup table 200 may include one or more sensor columns 202. In the illustrated example, nine columns 202 are shown, though it will be appreciated that the table 200 may have more or less columns than illustrated.

As shown, the table 200 captures the backup localization for each of the plurality of sensors 104 such that the backup localization is indicated as 'Yes' in the table 200. The table 200 further captures the primary localization based on the at least one outlier sensor of the plurality of sensors 104 such that the primary localization is indicated as 'No'. The table 200 captures the backup and the primary localization for the plurality of sensors 104 at a predetermined time interval. The primary localization is captured based on the at least one outlier sensor. In one example, the predetermined time interval for capturing the backup and the primary localization for the plurality of sensors 104 may vary or remain the same. For instance, the table 200 may capture the backup and primary localization for GPS sensor 106 at a time interval of 10 seconds (s), while the backup and primary localization for the V2X odometry sensor 116 may be provided at a time interval of 20 s. Alternately, the backup and the primary localization for the V2X odometry sensor 116 may be provided at a time interval of 10 s.

In one example, the backup localization for the GPS sensor 106 is captured in the table 200 at time ~t, represented as 'Yes'. When the GPS sensor 106 starts yielding the outlier data stream at a first time period t1~10 s, the GPS sensor 106 is detected as the at least one outlier sensor and the corresponding primary localization is captured in the table 200 as indicated by 'No'. As shown in the table 200, the GPS sensor 106 continues providing the outlier data stream at a second time period (i.e. t2~20 s) and at a third time period (i.e. t3~30 s) and the same is captured in the table 200.

Similarly, the table 200 may capture the backup and the primary localization for a V2X localization sensor, a V2X odometry sensor, a visual odometry sensor (e.g., the odometry sensor 116, as shown in FIG. 1), and a wheel odometry sensor. As shown in the table 200, the backup localization for the V2X localization sensor is captured until the first time period t1, and the primary localization, corresponding to the outlier data stream provided by the V2X localization sensor, is captured at the second and the third time periods t2 and t3. In other words, the V2X localization sensor yields the outlier data stream at the second time period t2=(t+t1)~40 s and continues yielding the outlier data stream at the third time period t3=(t2+t1+t)~60 s. In other instances, the table 200 can be look-up table generated by real-world experimentation.

The data stream yielded by the V2X odometry sensor and the visual odometry sensor is detected as the outlier data stream at the third time period (i.e. t3) and the corresponding primary localization is captured in the table 200. It may be contemplated that the visual odometry sensor yields the outlier data stream when the visual odometry sensor such as a camera may become dirty and can no longer detect images of the vehicle 102 (shown in FIG. 1) and its surroundings.

As shown in the table 200, only the backup localization is captured at all the defined time periods for the wheel odometry sensor, indicating that the wheel odometry sensor is not spoofed and does not yield the outlier data stream.

While the table 200 shows the backup and the primary localization for the GPS, the V2X odometry, the visual odometry, and the wheel odometry sensors, it should be noted that the table 200 may provide the backup and the primary localization data for each of the plurality of sensors 104 that may either be located on the vehicle and/or on the device of the user that remains in communication with the vehicle 102.

Based on the backup and the primary localization for one or more of the plurality of sensors 104, the table 200 captures the localization error estimate (D). In one example, the difference between the backup and the primary localization provides the localization error estimate. As shown, the table 200 captures the localization error estimate (D) at a predetermined travel distance, including D1 (1 m), D2 (2.0 m), D3 (3.2 m), and D4 (10 m), corresponding to the defined time periods.

Figure 3:
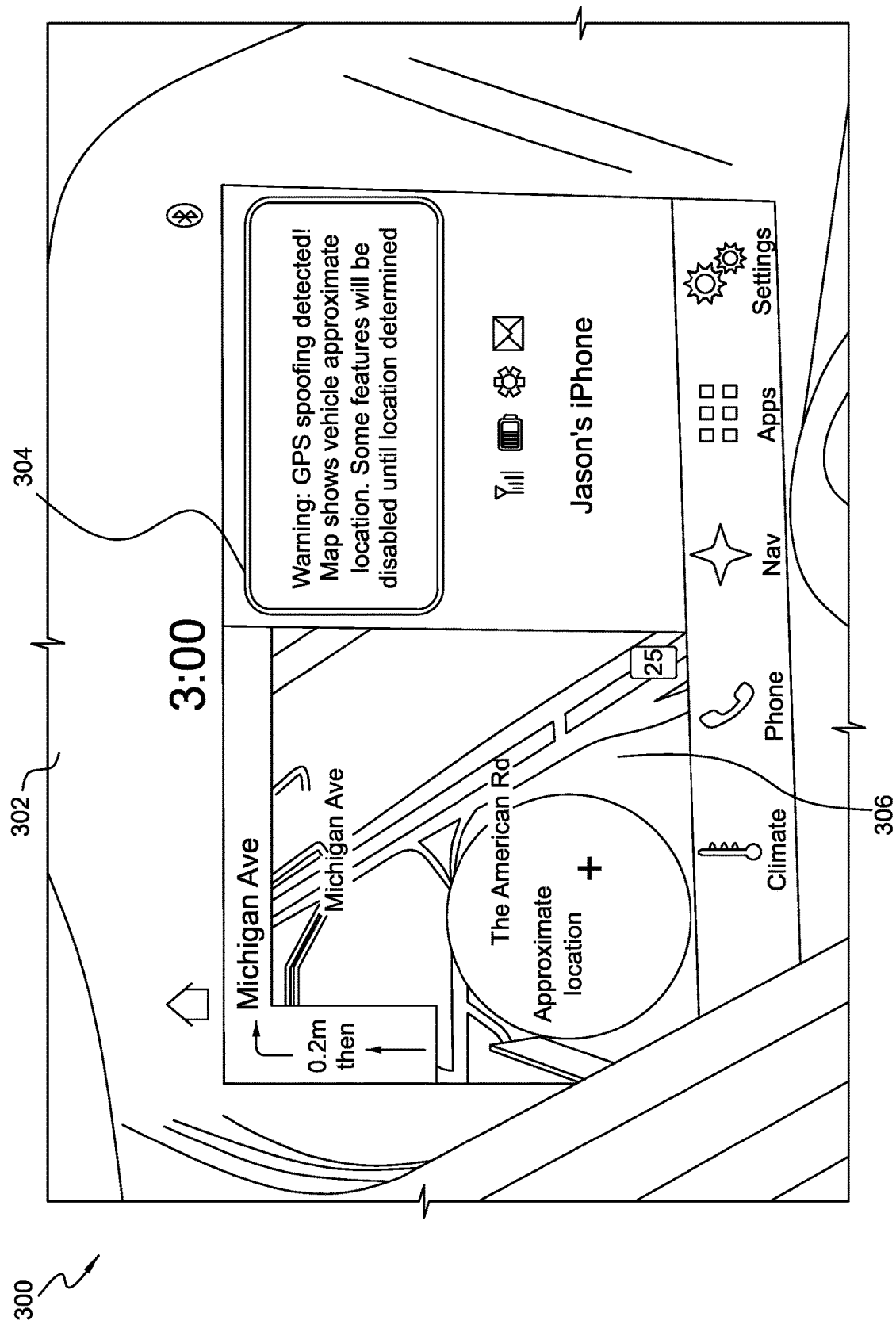
FIG. 3 illustrates an example of providing a notification to a user when a spoofing attack such as a GPS spoofing attack is detected by the system, in accordance with one aspect of the present disclosure.

FIG. 3 shows an example of providing a notification 300 to the user of the vehicle 102 when the spoofing attack such as the GPS spoofing attack is detected by the system 100, in accordance with one aspect of the present disclosure. While not shown explicitly in FIG. 1, the vehicle 102 may include a display unit such as HMI display unit 302 that allows the user to interact with the system 100 through one or more inputs, such as a voice command, a gesture control, a touch-input, and the like. The HMI display unit 302 is configured to provide one or more notification types 300 to the user in case the localization error estimate for at least of the plurality of sensors 104 exceeds or meets the threshold (i.e. a spoofing attack is detected).

In one example, the notification type 300 includes a message such as a warning message 304 that is displayed on the HMI display unit 302 to notify the user about the detected GPS spoofing attack. The warning message 304 includes a text message such as "GPS spoofing detectedl Map shows vehicle's approximate location. Some features will be disabled until location determined" or the like displayed on the HMI display unit 302. The warning message 304 may notify the user that due to the GPS spoofing, the GPS sensor 106 detected as the at least one outlier sensor, is disabled and can be enabled once the data stream yielded by the GPS sensor 106 reaches below the threshold. In an example, the GPS sensor 106 may not be disabled and only the warning message 304 is displayed for an action from the user. In another example, the anomalous data stream yielded by the GPS sensor 106 may be removed from use by the system 100. Those skilled in the art would understand that one or more other features of the system 100 may be disabled along with the GPS senor 106 upon detection of the spoofing attack on the at least one of the plurality of sensors 104 such a GPS spoofing attack. The spoofing attack may also be referred to as hacking, threat, risk and the like.

In an example, wherein the system 100 monitors the user state, the notification type 300 may be based on the user state. As explained in previous examples, the data stream of the GPS sensor 106 or the each of the at least one outlier sensor is resumed for use by the system 100, once the data stream reaches below the threshold.

As shown in FIG. 3, the HMI display unit 302 also provides a trajectory map data 306 that indicates the detection of the outlier data stream generated by the GPS sensor 106. The trajectory map data 306 may be used to depict the primary localization, as it shows a mismatch between the current location and the estimated/backup location of the vehicle 102. A confidence interval of the sensor fusion process, discussed above with respect to FIGS. 1 and 2, can also be implemented to depict the primary location.

While in the illustrated example, the notification 300 is displayed on the HMI display unit 302 of the vehicle 102 as the warning message 304, it should be noted that the notification 300 may be displayed on the device of the user such as the mobile device.

Figure 4:
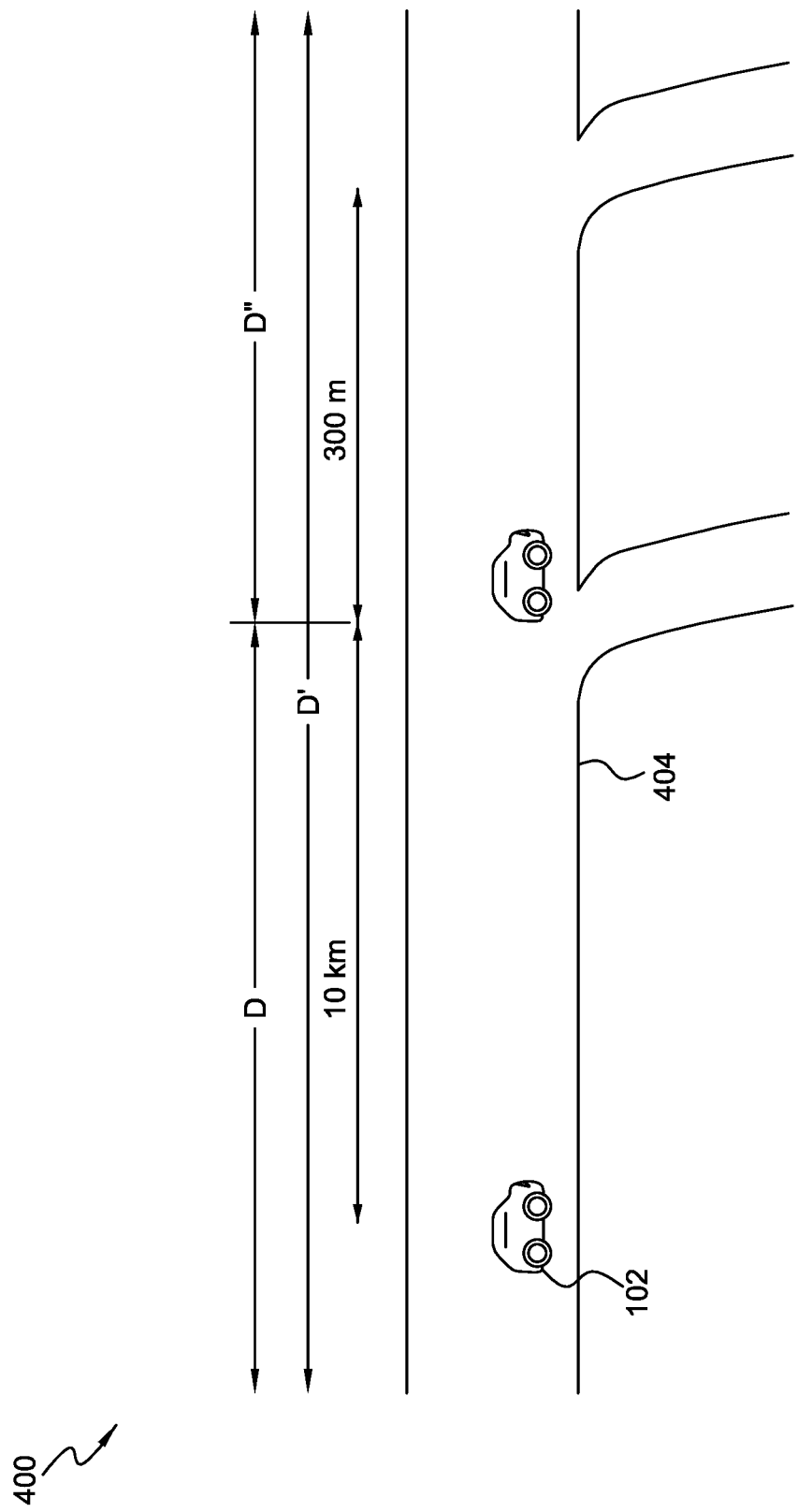
FIG. 4 illustrates an exemplary aspect of detection of an outlier data stream coming from a wheel speed sensor, in accordance with one aspect of the present disclosure.

FIG. 4 shows an exemplary aspect of detection of an outlier data stream 400 in the wheel speed sensor (not shown), in accordance with one aspect of the present disclosure. In one example, the wheel speed sensor yields the data stream related to the vehicle's wheel rotation speed. As illustrated, the system 100 (shown in FIG. 1) detects the localization error estimate computed as a wheel speed error when the wheel speed sensor provides the outlier data stream 400 due to the spoofing attack. In the illustrated example, the wheel speed sensor is detected with the outlier data stream 400 having a ±3% localization error estimate. This indicates that for every 10 kilometers (km) of a total distance traveled D' by the vehicle 102, a distance error D" computed is ±300 meters (m). Therefore, for the distance error D" of +300 m, the primary localization over the distance of 10 km computes the total distance travel D' of 10.3 km. Whereas, with the distance error D" of -300 m, the primary localization over the distance D of 10 km computes the total distance traveled D' as 9.7 km. It should be noted that, due to the accumulation of the localization estimate error in the wheel speed sensor over a predetermined distance of travel, the accuracy of the distance estimated by the system 100 is compromised.

FIG. 5 shows an exemplary safe recovery table 500 that may be employed by the system 100 for a safe recovery of the vehicle 102 once the processor 104 detects the at least one outlier sensor. To that end, as soon the processor 104 detects the at least one outlier sensor using the lookup table 200 (as described in FIG. 2), the processor 104 notifies the user about the spoofing attack. Eventually, the processor 120 may take reference from the safe recovery table 500 (stored in the memory 122) to activate/deactivate one or more features of the advanced system 100 (hereinafter referred to as ADAS features) to overcome the spoofing attack. It will be appreciated that the safe recovery table 500 may have more or fewer fields than illustrated.

In one aspect of the present disclosure, the safe recovery table 500 provides a location error 502 and safety levels 504. It may be understood that the location error 502 may be equivalent to the localization error estimate calculated for the at least one outlier sensors. The safety levels 504 may represent multiple levels at which the one or more ADAS features may operate. The shown example provides five safety levels 504 (e.g. 0, 1, 1.5, 3, 3.5) across which the ADAS features may operate based on the value of location error 502 estimated by the system 100. It should be noted that the safety levels 504 may be either automatically selected by the system 100 or may be set by the user.

In one example, while the system 100 operates at the safety level 3 of the safety levels 504, a highway assist feature of the system 100 may behave nominally till the location error 502 is <2 m, however, the system 100 may request the user to take control of the steering wheel for a value of the location error 502 between 3 m to <5 m.

In another example, while the system 100 operates at the safety level 3.5 of the safety levels 504, a highway assist feature of the system 100 may behave nominally till the location error 502 is <1 m. The system 100 may request the user take control of the steering wheel and requests user to confirm a lane change for a value of the location error 502 between 1 m to <3 m. The system 100 may request the user to take control of the steering wheel and fall back to highway assist feature for a value of the location error 502 between 3 m to <5 m. In another example where the system 100 operates at a safety level 1 of the safety levels 504, map route feature of the system 100 may behave nominally till the location error 502 is <3 m, however, the system 100 may request the user to input his/her current location for the location error 502 between 5 m to <20 m.

Figure 6:
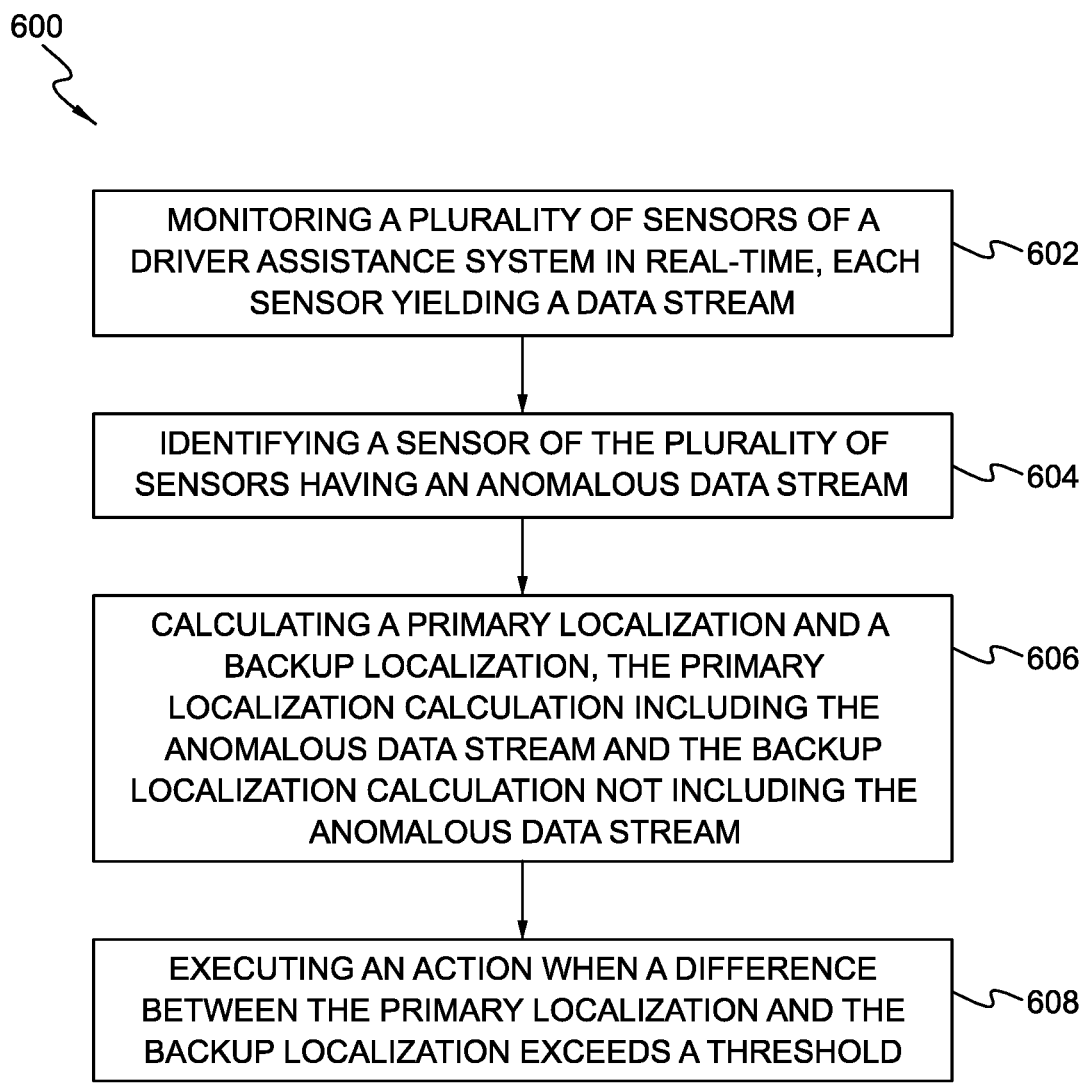
FIG. 6 illustrates a method for monitoring a driver assistance system, in accordance with one aspect of the present disclosure.

FIG. 6 illustrates a method 600 for monitoring the system 100 (as shown in FIG. 1), in accordance with one aspect of the present disclosure. The method 600 of FIG. 6 may be embodied as executable instructions in a non-transitory computer-readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 6 are performed in the cloud). The steps identified in FIG. 6 (and the order thereof) are exemplary and may include various alternatives, equivalents, or derivations thereof including but not limited to the order of execution of the same.

At step 602, the system 100 monitors each of the plurality of sensors 104 of the system 100 in real-time, where each sensor yields the data stream. More specifically, the data stream yielded by each of the plurality of the sensors 104 is monitored by the system 100. In one example, the monitoring of the plurality of sensors 104 may include monitoring the real-time data stream yielded by the global positioning system (GPS) sensor 106, the lidar sensor 108, the radar sensor 110, the infrared sensor 112, the camera 114, the odometry sensor 116 and/or the one or more interior sensors 118.

At step 604, the system 100 identifies the sensor that is the outlier sensor of the plurality of sensors 104 having anomalous data stream. The system 100 identifies after analyzing the real-time data stream yielded by each of the plurality of sensors 104. It should be noted that the one or more machine learning models, for example, the ensemble voting scheme or the recurrent neural network (RNN) model may be employed to analyze the data stream yielded by each of the plurality of sensors 104 to detect the at least one outlier sensor. Further, in an embodiment, the ensemble voting scheme or the RNN model may be employed to analyze the output values, variance, gradient in changes, signal strength, image/point cloud data features or other metadata to detect faulty sensors, jamming, or spoofing. In one example, the at least one outlier sensor provides an anomalous localization data of the vehicle 102.

At step 606, the backup localization and the primary localization is calculated, where the primary localization calculation includes the anomalous data stream and the backup localization calculation does not include the anomalous data stream. The primary localization is computed based on the at least one outlier sensor. The lookup table 200 (as described in FIG. 2) may be employed to calculate the primary as well as the backup localization of the vehicle 102. The table 200 captures the primary localization based on the anomalous data stream yielded by each of the at least one outlier sensor, as a result of spoofing of the at least one outlier sensor. In contrast, the backup localization data is expected data stream for one or more of the plurality of sensors 102 that is computed by the system 100 either in absence of the at least one outlier sensor or prior to the detection of the at least one outlier sensor. As discussed above, the one or more machine learning models, such as the ensemble voting scheme and/or the recurrent neural network, may be employed to calculate the backup and the primary localization.

The calculated backup localization and the primary localization are used, to determine the difference between the backup and the primary localization. The difference is the localization error estimate. The localization error estimate aids in estimating the deviation of the localization of the vehicle 102 from its estimated localization.

At step 608, the system 100 executes an action when the difference, that is the localization error estimate, exceeds the threshold. In an embodiment, the system 100 notifies the user about the spoofing attack, when the localization error estimate meets or exceeds the threshold. Particularly, notification in the form of a warning signal and/or alert message is communicated to the user through the HMI display unit 301 (as shown in FIG. 3) or any other suitable display unit. In one example, the notification provided to the user includes information related to the disabling of the at least one outlier sensor and/or removing the data stream of each of the at least one outlier sensor from use by the system 100. It should be noted that the system 100 may monitor the user state to select a notification type that may be provided to the user.

One aspect of the present disclosure may provide a method (as described in FIG. 7 below) that may be employed by the system 100 when the ADAS features are active. However, in another aspect, a method may be provided to practice the system 100 when the one or more ADAS features are inactive, as discussed in FIG. 8 below. Such a method may be employed when the system 100 has disabled one or more of the at least one outlier sensor.

Figure 7:
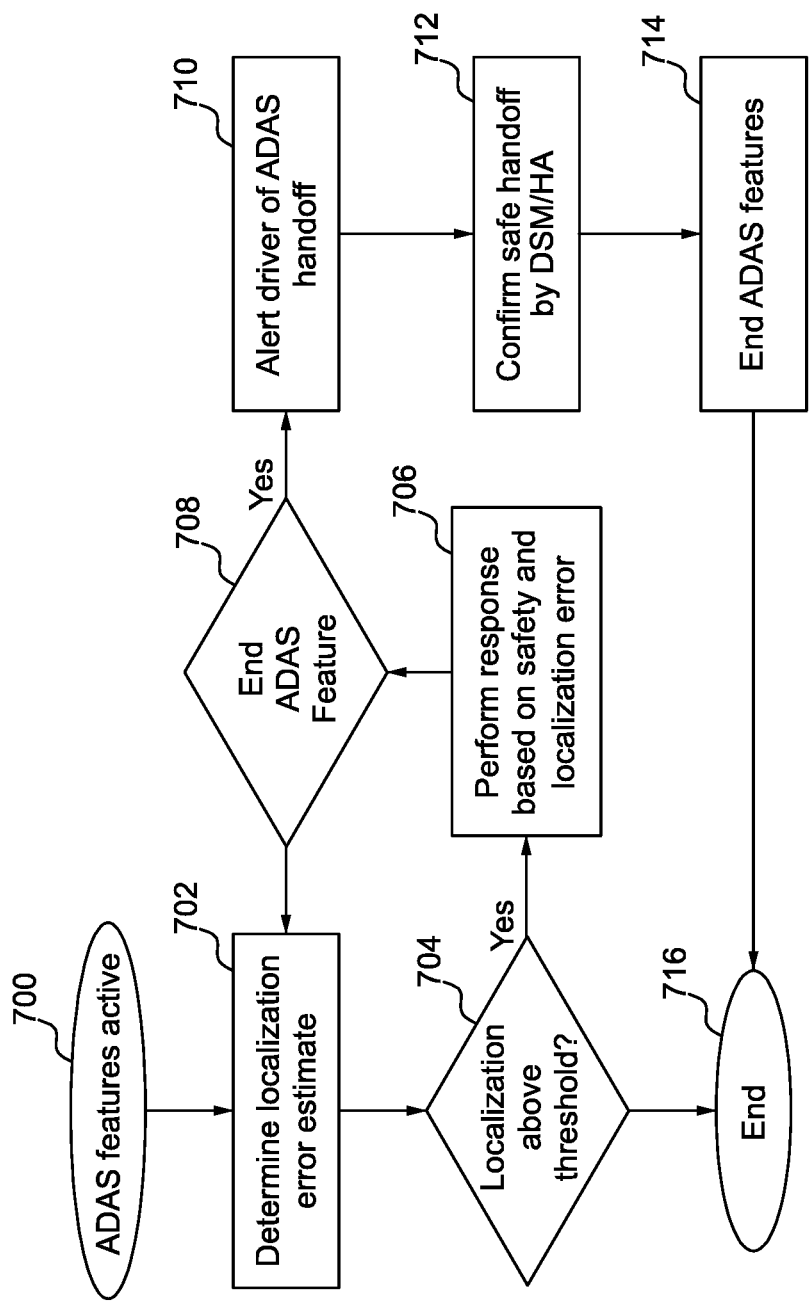
FIG. 7 illustrates a method for monitoring a driver assistance system when advanced driver assistance features are active, in accordance with one aspect of the present disclosure.

Referring to FIG. 7, the method begins at step 700 where the ADAS features are active. The features may include navigation features, map features, collision-avoidance features, highway driving assistance features, and the like. The method 700 of FIG. 7 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 7 are performed in the cloud). The steps identified in FIG. 7 (and the order thereof) are exemplary and may include various alternatives, equivalents, or derivations thereof including but not limited to the order of execution of the same.

At step 702, the localization error estimate is determined using the backup localization and the primary localization. In one example, the ensemble voting scheme is employed to calculate the localization error estimate. In another example, the recurrent neural network is employed to calculate the localization error estimate. It should be noted that the calculation of the localization error estimate may employ one or more steps, as discussed in FIG. 6 above.

At step 704, the method determines if the localization error estimate meets or exceeds the threshold. In case the localization error estimate is below the threshold, the method ends at step 716, otherwise, the method moves to step 706

At step 706, the system 100 performs the safe recovery of the vehicle 102 (as described in FIG. 5), when the localization error estimate is determined to meet or exceed the threshold. In one example, the threshold may be computed based on the historical localization error data.

Based on the localization error estimate for the vehicle safety level, it is decided if the one or more ADAS features should be disabled or not, at step 708. In case the localization error estimate for the safety level allows disabling of the one or more ADAS features, an alert to take a handoff of the one or more ADAS feature is provided to the driver, at step 710.

Once the safe handoff of the ADAS feature is confirmed at step 712, the one or more ADAS feature is finally disabled at step 714.

Figure 8:
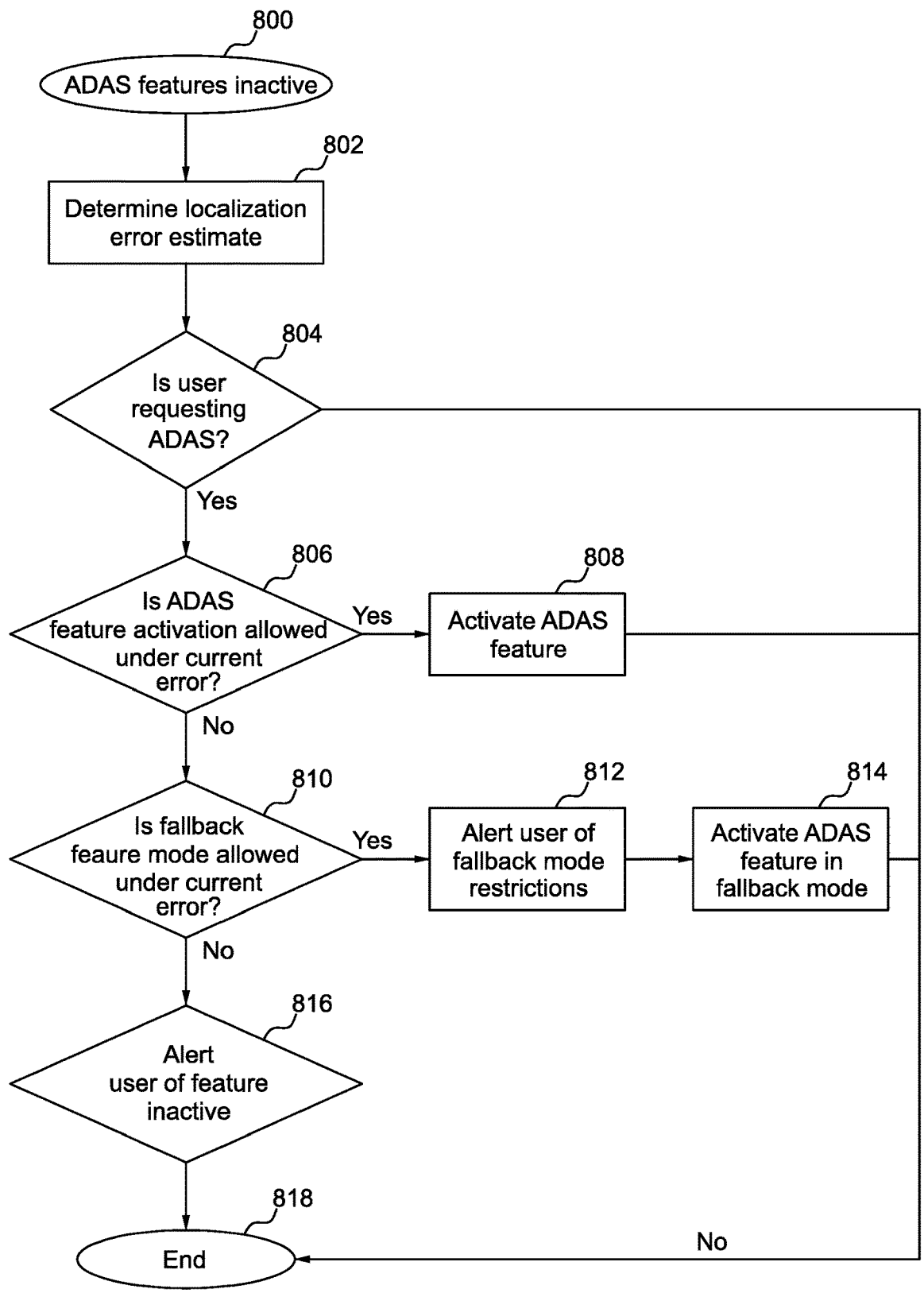
FIG. 8 illustrates a method for monitoring a driver assistance system when advanced driver assistance features are inactive, in accordance with one aspect of the present disclosure.

As shown in FIG. 8, the method begins at step 800 wherein the ADAS features are inactive. At step 802, the localization error estimate is determined. At step 804 it is determined if the user is requesting for at least one of the ADAS features. The method 800 of FIG. 8 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 8 are performed in the cloud). The steps identified in FIG. 8 (and the order thereof) are exemplary and may include various alternatives, equivalents, or derivations thereof including but not limited to the order of execution of the same.

Once the request for the at least one of the ADAS features is confirmed at step 806, the system 100 determines whether activation of the requested at least one of the ADAS features is allowed as per the localization error estimate (determined at step 802) or not. In case the localization error estimate is below the threshold, the system 100 activates the at least one of the requested ADAS features at step 808; else the system 100 determines if a fallback feature mode is allowed as per the localization error estimate, at step 810. Those skilled in the art would understand that while detecting the outlier data stream provided due to the spoofing attack on the at least one outlier sensor, the system 100 allows at least one target sensor (that is expected to be spoofed based on the localization error estimate) to function in the fallback mode while the safe recovery of the at least one of the ADAS features is underway. Allowing the fallback mode indicates that the at least one of the requesting ADAS features may function for a time period before the inactivation of the ADAS feature is required for the safe recovery of the vehicle 102.

In case the system 100 allows the fallback feature mode for the localization error estimate, the system activates the at least one of the requested ADAS features in the fallback mode (at step 814) after providing an alert to the user about the fallback mode restrictions (at step 812).

In contrast, if the system 100 does not allow the fallback feature mode for the localization error estimate, an alert is provided to the user about the inactive requested at least one of the ADS features (as step 810) and the method is terminated (at step 818).

Although the present disclosure has been described with reference to specific examples, this description is not meant to be construed in a limiting sense. Various modifications of the disclosed examples, as well as alternate examples of the present disclosure, will become apparent to persons skilled in the art upon reference to the description of the present disclosure. It is therefore contemplated that such modifications can be made without departing from the spirit or scope of the present disclosure as defined.

What is claimed is:

1. A method for addressing an error in a localization system, the method comprising:
monitoring a plurality of sensors of a driver assistance system in real-time, each sensor generating a data stream;
identifying a sensor of the plurality of sensors having an anomalous data stream;
calculating a primary localization from the respective data streams, including the anomalous data stream, from the plurality of sensors;
calculating a backup localization from a subset of the respective data streams that does not include the anomalous data stream;
determining an error estimate based on a difference between the primary localization and the backup localization; and
executing an action when the error estimate of the backup localization exceeds a threshold.

2. The method of claim 1, wherein the step of identifying the sensor having the anomalous data stream includes using at least one of an ensemble voting scheme or a recurrent neural network.

3. The method of claim 1, wherein the action includes removing the anomalous data stream of the sensor so that it is not used by the driver assistance system.

4. The method of claim 1, wherein the action includes displaying a notification when the anomalous data stream is detected.

5. The method of claim 1, wherein at least one sensor of the plurality of sensors is located on a vehicle.

6. The method of claim 1, further comprising:
tracking the anomalous data stream of the sensor; and
adding the anomalous data stream of each of the sensors for use by the driver assistance system when the anomalous data stream is below the threshold.

7. The method of claim 1, wherein determining the difference between the primary localization and the backup localization includes retrieving primary localization data from a lookup table.

8. The method of claim 1, wherein the step of calculating the backup localization is based on a subset of the plurality of sensors without the sensor having the anomalous data stream.

9. The method of claim 1, wherein calculating the primary localization is based on data from the anomalous data stream of the sensor, wherein the data is retrieved prior to detection of the anomalous data stream.

10. A driver assistance system comprising:
  a plurality of sensors, each sensor generating a data stream; and
  a processor that executes instructions stored in memory, wherein execution of the instructions by the processor:
    monitors a plurality of sensors of the driver assistance system in real-time, each sensor generating a data stream;
    identifies a sensor of the plurality of sensors having an anomalous data stream;
    calculates a primary localization from the respective data streams, including the anomalous data stream, from the plurality of sensors, the primary localization calculation including the anomalous data stream;
    calculates a backup localization calculation from a subset of the respective data streams not including the anomalous data stream;
    determines an error estimate based on a difference between the primary localization and the backup localization; and
    executes an action when the error estimate of the backup localization exceeds a threshold.

11. The system of claim 10, wherein the processor identifies the sensor having an anomalous data stream includes using at least one of an ensemble voting scheme or a recurrent neural network.

12. The system of claim 10, wherein the action includes removing the anomalous data stream of the sensor from use by the driver assistance system.

13. The system of claim 10, wherein the action includes displaying a notification when the anomalous data stream is detected.

14. The system of claim 10, wherein at least one sensor of the plurality of sensors is located on a vehicle.

15. The system of claim 10, wherein execution of instructions by the processor:
  tracks the anomalous data stream of the sensor; and
  adds the anomalous data stream of each of the sensors for use by the driver assistance system when the anomalous data stream is below the threshold.

16. The system of claim 10, wherein execution of the instructions by the processor to determine a difference between the primary localization and the backup localization includes further execution of the instructions by the processor to retrieve backup localization data from a lookup table.

17. The system of claim 10, wherein calculating the backup localization is based on a subset of the plurality of sensors without the sensor having the anomalous data stream.

18. The system of claim 10, wherein calculating the primary localization is based on data from the anomalous data stream of the sensor, wherein the data is retrieved prior to detection of the anomalous data stream.

* * * * *